7112X
A. Wiswell.
Square.
Patented Jan. 7, 1832.
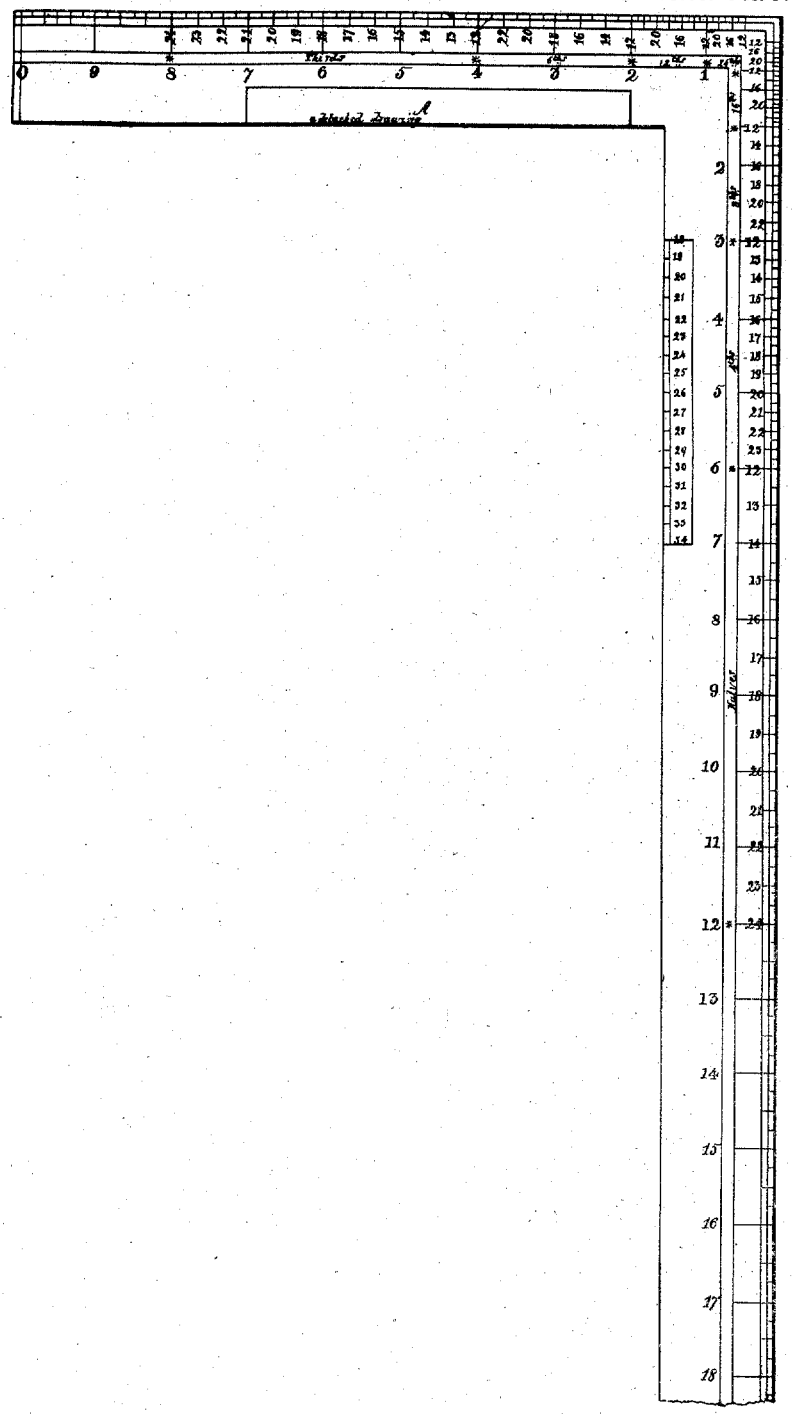

Andrew Wiswell. of Exeter. State of New Hampshire.

Letters Patent.

The schedule referred to in these Letters Patent and making part of the
same containing a description in the words of the said Andrew Wiswell
himself of his improvement in the Tailors improved Square for delinea
-ting Garments Be it known that I Andrew Wiswell of Exeter in the County of Rocking
-ham & State of New Hampshire, have invented a new and useful improve
-ment in the Tailors improved Square, for delineating garments, which may
be made of wood or metal, and that the following is a full description of
said Square as improved by me
All Tailors delineate their garments by the breast measure divided and to
cut a garment by mathematical proportions it is necessary to use a square,
The breast measure divisions have been obtained in a great variety of ways
but all in such a way, as to perplex the mind, and encumber the cutting board.
My improvement is to have all the sizes divided and laid down on the Square
so as to supersede the necessity of changing slides or having a division mea
-sure book, or strip of paper or sticks divided, as is now the practice
On the outer edge of the long arm of the square in the first & second
spaces are the divisions of inches, and also the divisions of breast measure,
In the third space is the numbers divided. In the fourth is the stars
to show the divisions and the names of the divisions
The fifth space is the inches. The scale of figures on the inside of the long
arm, commencing at four and ending at eight inches, is to get the width of
back across the shoulders by measuring from the centre of the back, around
the shoulders to the centre of the back again, and whatever number of inches;
that is, find the same on the scale, and the back must be the width from
the number to the elbow of the square. —
[illegible] twenty six inches around the shoulders from the

7112X centre of the back, then the back of the coat must be [illegible] inches across the shoulders. The first and second space on the short arm, is divided into inches, thirds, halves, sixths, and twelfths of an inch and also the division of breast measure. The strip of [illegible] on the inner space is to put down the measure on. To explain the square more fully. The division from twelve to twenty four inches, are laid down on the square, If you wish to work by twenty four inches, the half of that number may be found at twelve inches, the fourth at six inches, the eighth at three inches, the sixteenth at one and a half inch, the thirty second at three quarters of an inch. The third at eight inches (on the short arm), the sixth at four inches, the twelfth at two inches, the twenty fourth at one inch, and in this way you may find the division of twenty three, or any other number down to twelve.

And when a Tailor understands the principle of this square he may cut a garment by it of larger or smaller size than is laid down here, For instance the divisions of halves are one half inch to a size the fourth, one fourth of an inch to a size, the eighths are one eighth of an inch to a size, the thirds are one third of an inch the sixth one sixth of an inch. the twelfth, one twelfth of an inch & the square is twenty four inches long, the long arm and the short arm are ten inches long and are one and an half inch wide, made of box wood. This I conceive to be the most convenient size & the best material to make them of, but they may be made of metal, or any other hard wood, and of any convenient size, above eight by twelve inches.

In testimony that the above is a true specification of my own improvement as above described I have hereunto set my hand, this [illegible] day of May in the year of our Lord one thousand Eight hundred and thirty two, Witnesses
Joseph [illegible]
Jonathan Lawrence Andrew [illegible]

770 [illegible]

Ex: [illegible]